March 24, 1925.
F. E. TROUTMAN ET AL
1,530,629
METHOD AND APPARATUS FOR CASTING PLATE GLASS
Filed July 24, 1922
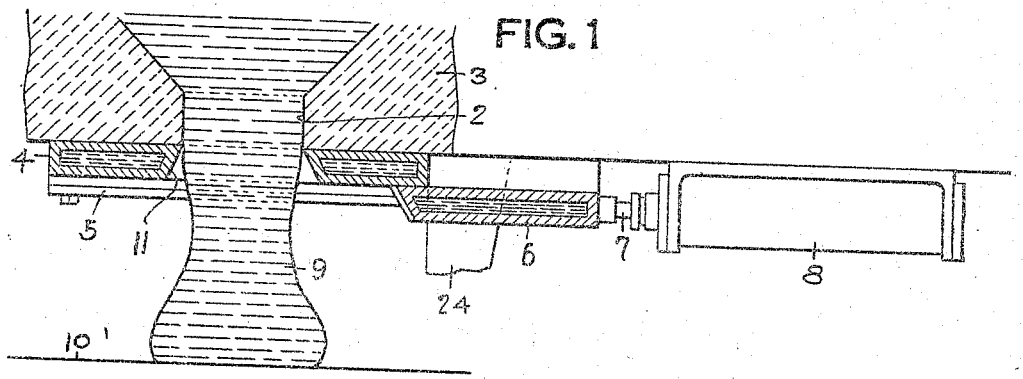
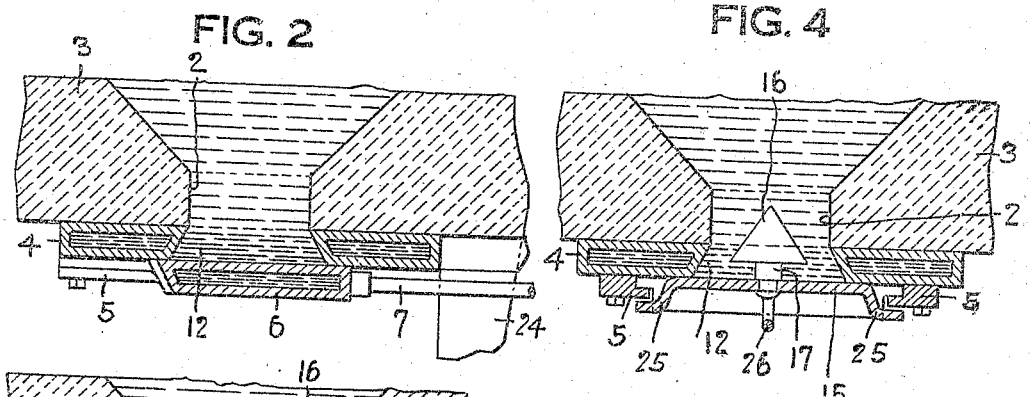
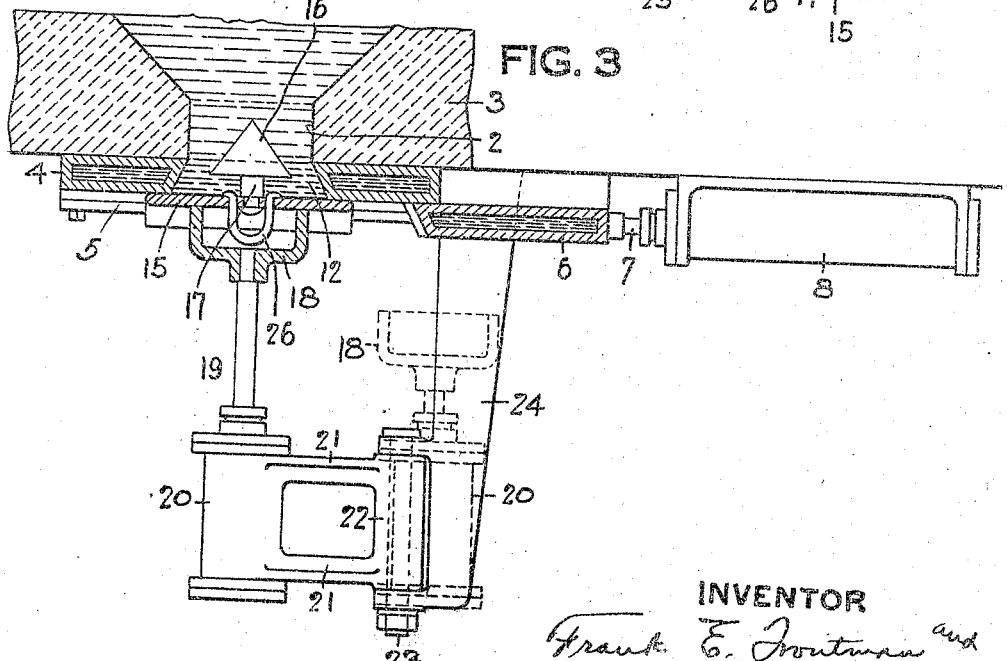

Patented Mar. 24, 1925.

1,530,629

UNITED STATES PATENT OFFICE.

FRANK E. TROUTMAN AND CHARLES H. CHRISTIE, OF BUTLER, PENNSYLVANIA.

METHOD AND APPARATUS FOR CASTING PLATE GLASS.

Application filed July 24, 1922. Serial No. 577,245.

*To all whom it may concern:*

Be it known that we, FRANK E. TROUTMAN and CHARLES H. CHRISTIE, citizens of the United States, and residents of Butler, in the county of Butler and State of Pennsylvania, have invented a new and useful Improvement in Methods and Apparatus for Casting Plate Glass; and they do hereby declare the following to be a full, clear, and exact description thereof.

Our invention relates to the manufacture of plate glass by casting and rolling, and it has special reference to the discharge of molten glass from a tank or other container and the delivery of the discharged glass upon the casting table.

When molten glass is delivered to a casting table through a downwardly opening outlet, it has heretofore been a matter of considerable difficulty to cause the glass to issue from the outlet with a clean leading end, because it is necessary to shut off the flow of glass after each casting operation and when the flow is again started the first portion of glass which flows through the outlet is likely to carry with it portions of glass which have solidified around the outlet between the casting operations, and also carries with it any fire-clay fragments or other impurities which may have been dislodged from the edges of the outlet by the valve or plunger which has heretofore been used to control the flow of glass. It is the object of our invention to improve the delivery of glass to casting tables by insuring that the leading end of the issuing glass shall be clean, hot and free from strings of solidified glass. To this end, we provide means which operates whenever the flow of glass through the outlet is stopped to chill the portion of glass immediately below the outlet, thus forming a plug of solidified glass. When the next charge of glass is to be poured we remove this plug of solidified glass in a single piece, which carries with it any strings or other irregular masses that may have accumulated at the outlet, and leaves the outlet open for the discharge of fresh, hot glass.

A simple and effective arrangement for carrying our invention into practice is shown in the accompanying drawing, in which Fig. 1 is a vertical sectional view taken centrally through the outlet of a casting tank equipped with our invention, and showing a charge of glass in process of being delivered; Fig. 2 is a similar view showing the method of interrupting the flow of glass; Fig. 3 is a similar view showing the additional apparatus which we employ for removing the plug of solidified glass; and Fig. 4 is another sectional view of a portion of the parts shown in Fig. 3, the section being taken at right angles to Fig. 3.

In the drawing, the numeral 2 indicates the outlet through which molten glass flows from a tank-furnace or other container, this opening being ordinarily formed in a fire-clay bushing 3. Surrounding the opening 2, and attached to the under side of the bushing 3, is a hollow ring 4 through which water or other cooling fluid or air may be circulated by means which are not shown in the drawing, since such cooling means are well known in this art. Beneath the ring 4 is secured a pair of parallel guideways 5 in which is slidably mounted a knife 6 which, like the ring 4, is hollow and is provided with means for cooling. The knife 6, as shown, is connected to one end of the piston rod 7 of a pressure cylinder 8 provided with any ordinary connections, not shown, for supplying pressure to reciprocate the piston rod 7 and the knife 6. The parts thus far described are similar to those shown in our copending application for Letters Patent, Serial No. 525,327, filed December 28, 1921.

When the knife 6 is in the position shown in Fig. 1, a column of glass, indicated by the numeral 9, flows through the outlet 2 and may be received upon a casting table indicated diagrammatically at 10. When a sufficient quantity of glass has been deposited on the table 10, the flow of glass is cut off by moving the knife 6 across the opening into the position shown in Fig. 2. It will be observed that the inner edge of the ring 4 flares downwardly and outwardly, as shown at 11, and that when the knife 6 is in the position shown in Fig. 2 it cooperates with the ring 4 to form a chilled frusto-conical chamber 12, the sides of which are surrounded by the water-cooled ring 4 and the bottom of which is in contact with the water-cooled knife 6. The glass in the space 12 therefore begins to chill rapidly without, however, adhering to the ring 4 or the knife 6, and this chilling action soon produces, immediately above the knife 6, a layer of solidified glass which is strong enough to hold up the weight of molten glass immediately above the outlet. When the chilling has proceeded thus far the knife 6 is again withdrawn to the position shown in Fig. 1. No glass flows through the outlet at this time because of the lateral pressure exerted through the still molten interior of the space 12, which pressure has forced the solidifying glass adjacent to the ring 4 to cling to the chilled ring, without, however, producing surface adhesion between the glass and the ring.

We then bring beneath the outlet 2 the device shown in Fig. 3, which consists of a flat metal plate 15 carrying a conical spearhead 16 which is raised somewhat above the plate 15 by a shank 17. The plate 15 rests loosely upon a hollow support 18 which is secured to the upper end of the vertical piston rod 19 of a fluid-pressure cylinder 20 that is carried by arms 21 which extend from a sleeve 22 pivoted upon a pin 23 which is carried in a bracket 24. The cylinder 20 may be otherwise supported, the only requirement being that it shall be able to swing beneath the glass outlet 2 and later to swing away from the glass outlet to permit the glass to descend upon the casting table.

The spear-head device shown in Fig. 3 is placed upon the support 18 and, as stated above, is swung beneath the glass outlet 2. The cylinder 20 is then operated to raise the plate 15, thus causing the spear-head 16 to pierce the plug of solidified or partially solidified glass, the interior of which, at this time, is still somewhat plastic, or may even be entirely fluid. This upward movement of the spear-head continues until the plate 15 rests flat against the under side of the ring 4. In order to permit this movement the sides of the plate 15 adjacent to the knife guideways 5 are bent downwardly as shown at 25, Fig. 4.

The cylinder 20 is then operated to lower the piston rod 19, thereby withdrawing the support 18 and leaving the plate 15 held up by the spear-head 16 which is embedded in the glass. The cylinder 20 is then swung to one side, as shown in dotted lines, Fig. 3.

When the next casting operation is to be started the plate 15 is pulled down by any suitable means, carrying with it all of the glass which has been solidified through the chilling action of the knife 6 and the ring 4. For the purpose of thus withdrawing the spear-head device, we have shown on Figs. 3 and 4 a loop 26 projecting below the plate 15 in position to be engaged with a hook, lever or other suitable tool. The engagement between the glass plug and the walls of the outlet 2, while sufficient to prevent the flow of glass before the plug is withdrawn, is not sufficiently tight to require great force to withdraw the plug from the outlet. As the spear-head device is withdrawn with the plug of glass, it is swung to one side, thus leaving the glass outlet clear, and permitting the glass to issue with a hot and clean leading end.

The plug of glass may be readily cleared away from the spear-head device by placing the device in water while the glass is still hot. This cracks the glass and enables it to be readily removed.

When the above described device is employed for controlling the flow of glass no plunger or other form of valve is required within the tank, and the feeding arrangements are therefore greatly simplified as compared with other devices which have been used for this purpose.

It will be understood that the expression "plate glass", as used herein, is not restricted to glass plates that are ground and polished, but includes any form of flat glass, whether polished or not, as distinguished from hollow glassware.

While the apparatus described above is well suited for carrying out our invention, it will also be understood that various changes may be made within the scope of our invention as indicated in the appended claims.

We claim as our invention:

1. Apparatus for casting plate or rolled glass comprising a glass-receptacle having a downwardly opening outlet, a fluid-cooled ring disposed immediately beneath and around said outlet, a hollow fluid-cooled knife mounted for reciprocation beneath said outlet, and means for withdrawing solidified glass formed in said outlet by the chilling action of said ring and said knife.

2. Apparatus for casting plate or rolled glass comprising a glass-receptacle having a downwardly opening outlet, means for closing said outlet and for solidifying a portion of the glass adjacent to said outlet, and means for withdrawing said solidified glass from said outlet comprising a member adapted to penetrate said solidified glass, means for introducing said member into said outlet, and means for withdrawing said member from said outlet.

3. Apparatus for casting plate or rolled glass comprising a glass receptacle having a downwardly opening outlet, means for closing said outlet and for solidifying a portion of the glass adjacent to said outlet, and means for withdrawing said solidified glass from said outlet comprising a pointed member adapted to penetrate said solidified glass and having a shank of reduced diameter below its upper pointed end, means for introducing said member into said outlet, and means for withdrawing said member from said outlet.

4. Apparatus for casting plate or rolled glass comprising a glass receptacle having a downwardly opening outlet, means for closing said outlet and for solidifying a portion of the glass adjacent to said outlet, and means for withdrawing said solidified glass from said outlet comprising a plate adapted to cover said outlet from beneath, a pointed member carried by said plate and having a shank of reduced diameter below its pointed upper end, means for raising said plate beneath said outlet to cause said pointed member to enter said outlet, and means for withdrawing said plate from beneath said outlet.

5. Apparatus for casting plate or rolled glass comprising a glass receptacle having a downwardly opening outlet, means for closing said outlet and for solidifying a portion of the glass adjacent to said outlet, and means for withdrawing said solidified glass from said outlet comprising a plate adapted to cover said outlet from beneath, a pointed member carried by said plate and having a shank of reduced diameter below its pointed upper end, a fluid-pressure cylinder adapted to be swung beneath said outlet, and means carried by the piston rod of said cylinder for supporting said plate.

6. Apparatus for casting plate or rolled glass comprising a glass receptacle having a downwardly opening outlet, means for closing said outlet and for solidifying a portion of the glass adjacent to said outlet, and means for withdrawing said solidified glass from said outlet comprising a plate adapted to cover said outlet from beneath, a pointed member carried by said plate and having a shank of reduced diameter below its pointed upper end, a fluid-pressure cylinder adapted to be swung beneath said outlet, means carried by the piston rod of said cylinder for supporting said plate, and a member carried by said plate whereby said plate may be withdrawn from said outlet.

7. The method of casting plate or rolled glass that comprises permitting glass to flow through a downwardly opening outlet, interrupting the flow of glass through said outlet, chilling a portion of the glass adjacent to said outlet, and removing and discarding the plug of chilled glass thus formed, thereby opening said outlet for the discharge of another portion of glass.

8. The method of casting plate or rolled glass that comprises placing the glass in a receptacle having a downwardly opening outlet, chilling a portion of the glass adjacent to said outlet, thrusting into said outlet a member having a head adapted to engage and withdraw said solidified glass and withdrawing said member from said outlet, thereby removing said solidified glass and permitting fresh glass to flow through said outlet.

9. The method of casting plate or rolled glass that comprises placing the glass in a receptacle having a downwardly opening outlet, permitting glass to flow through said outlet, interrupting the flow of glass by means of a fluid-cooled closure member, chilling a portion of the glass adjacent to said outlet, withdrawing said closure member, thrusting into said outlet a member having a head adapted to pierce said solidified glass, and adapted to then become embedded in the glass, and then withdrawing said member, thereby removing said solidified glass and permitting a fresh portion of glass to flow through said outlet.

10. The method of casting plate or rolled glass that comprises placing the glass in a receptacle having a downwardly opening outlet, surrounding a portion of the glass adjacent to said outlet with a cooling surface, closing said outlet with a closure member having a cooling surface in contact with the glass to form a solidified plug, removing said closure member, and withdrawing the plug of solidified glass formed by said cooling surfaces.

11. The method of casting plate or rolled glass that comprises placing the glass in a receptacle having a downwardly opening outlet, surrounding a portion of the glass adjacent to said outlet with a cooling surface, closing said outlet with a closure member having a cooling surface in contact with the glass, removing said closure member, thrusting into said outlet a member having a head adapted to pierce said solidified glass, and adapted to then become embedded in the glass, and then withdrawing said member, thereby removing said solidified glass and permitting a fresh portion of glass to flow through said outlet.

12. The method of casting plate or rolled glass that comprises permitting glass to flow through a downwardly opening outlet, interrupting the flow of glass through said outlet, chilling the bottom surface of the glass within said outlet to form a holding plug for the glass thereabove, and removing said plug of chilled glass to thereby open said outlet for the discharge of another portion of glass.

13. The method of casting plate or rolled glass that comprises permitting glass to flow through a downwardly opening outlet, interrupting the flow of glass through said outlet, chilling the bottom surface of the glass within said outlet to form a holding plug for the glass thereabove, and removing said plug of chilled glass to thereby open said outlet for the discharge of another portion of glass, the middle portion of said plug being chilled to a lesser degree than the outer portions thereof, to permit insertion of a withdrawing tool through said relatively soft portion.

14. Apparatus for casting plate or rolled glass comprising a receptacle for the glass having a downwardly opening outlet, means for closing said outlet and for chilling a portion of the glass adjacent thereto to form a holding plug for the glass thereabove, and means for removing the said chilled portion.

In testimony whereof we, the said FRANK E. TROUTMAN and CHARLES H. CHRISTIE, have hereunto set our hands.

FRANK E. TROUTMAN.
CHARLES H. CHRISTIE.